United States Patent Office.

J. B. NEWBROUGH AND E. FAGAN, OF NEW YORK, N. Y.

Letters Patent No. 73,545, dated January 21, 1868.

---

IMPROVEMENT IN TREATING CAOUTCHOUC AND OTHER GUMS.

---

The Schedule referred to in these Letters Patent and making part of the same.

---

TO ALL WHOM IT MAY CONCERN:

Be it known that we, J. B. NEWBROUGH and E. FAGAN, of New York city, have invented a new substance or material; and we do hereby declare the following to be a full, clear, and exact description of the manner in which the same is produced.

By adding to iodine one-half its weight of bromine, proto-bromide of iodine is formed, and this, when combined with rubber, or equivalent gum, will produce a composition which will harden on being subjected for about an hour to a heat of 250° Fahrenheit. Owing to the volatile properties of proto-bromide of iodine, it cannot be applied without difficulty to practical purposes. To obviate this difficulty, we treat both the bromine and iodine, prior to combining the same, with oil of turpentine, or similar oil, which has previously been mixed with about one-fourth its weight of sulphuric acid, to prevent the formation of an explosive composition.

The pasty mixture, produced as above described, is combined with caoutchouc, or equivalent gum, in the proportion of about three ounces of the paste to a pound of gum, the proportion of gum being increased, if a more elastic product is desired. After the gum and paste are thoroughly incorporated, the composition may be hardened by subjecting it to a dry heat (of from 200° to 320° Fahrenheit) for from ten minutes to one hour and a half, the time being lengthened to increase the toughness of the product.

The product thus obtained may be applied to many useful and ornamental purposes, and any desired color may be imparted to the material by combining with the composition, before it is hardened, any suitable mineral or earthy coloring-matters.

We claim as our invention, and desire to secure by Letters Patent—

The within-described new manufacture or substance, consisting of caoutchouc, or equivalent gum, incorporated with iodine and bromine, (after treating the said iodine and bromine with turpentine, or equivalent oil, substantially as described,) and subjected to heat.

In testimony whereof, we have hereunto signed our names to this specification in the presence of two subscribing witnesses.

J. B. NEWBROUGH,
E. FAGAN.

Witnesses:
CHARLES E. FOSTER,
CHARLES P. HARTT.